United States Patent
Liu et al.

(10) Patent No.: US 10,488,885 B2
(45) Date of Patent: Nov. 26, 2019

(54) DISPLAY ADJUSTMENT METHOD AND DEVICE

(71) Applicant: BEIJING ZHIGU RUI TUO TECH CO., LTD., Beijing (CN)

(72) Inventors: Jia Liu, Beijing (CN); Hanning Zhou, Beijing (CN)

(73) Assignee: BEIJING ZHIGU RUI TUO TECH CO., LTD., Beijing (CN)

(*) Notice: Subject to any disclaimer, the term of this patent is extended or adjusted under 35 U.S.C. 154(b) by 164 days.

(21) Appl. No.: 15/531,684

(22) PCT Filed: Nov. 20, 2015

(86) PCT No.: PCT/CN2015/095078
§ 371 (c)(1),
(2) Date: May 30, 2017

(87) PCT Pub. No.: WO2016/086772
PCT Pub. Date: Jun. 9, 2016

(65) Prior Publication Data
US 2018/0335804 A1    Nov. 22, 2018

(30) Foreign Application Priority Data
Dec. 3, 2014   (CN) .......................... 2014 1 0724962

(51) Int. Cl.
*G06F 1/16* (2006.01)
*G05D 3/12* (2006.01)

(52) U.S. Cl.
CPC ............. *G06F 1/1649* (2013.01); *G05D 3/12* (2013.01); *G06F 1/1637* (2013.01); *G06F 1/1601* (2013.01); *G06F 1/163* (2013.01)

(58) Field of Classification Search
CPC ................................ G09G 5/38; G06F 1/1649
See application file for complete search history.

(56) References Cited

U.S. PATENT DOCUMENTS

| | | | |
|---|---|---|---|
| 6,752,498 | B2 | 6/2004 | Covannon et al. |
| 8,253,648 | B2 | 8/2012 | Nagai et al. |
| 8,270,672 | B2 | 9/2012 | Liao |

(Continued)

FOREIGN PATENT DOCUMENTS

| | | |
|---|---|---|
| CA | 2748469 | 2/2013 |
| CN | 201004329 Y | 1/2008 |

(Continued)

OTHER PUBLICATIONS

International Search Report and Written Opinion for Application No. PCT/CN2015/095078, dated Feb. 4, 2016, 9 pages.

*Primary Examiner* — Roy P Rabindranath
(74) *Attorney, Agent, or Firm* — Sheppard Mullin Richter & Hampton LLP

(57) ABSTRACT

The present application discloses display adjustment methods and devices. One display adjustment method disclosed herein comprises: acquiring display information of a display; and adjusting a posture and/or a location of the display according to the display information. The methods and the devices, which can actively adjust a location and a posture of a display according to display information, reduces adjustment steps to be performed by a user, thus increases use efficiency and improves user experience.

12 Claims, 6 Drawing Sheets

(56) References Cited

U.S. PATENT DOCUMENTS

| | | | |
|---|---|---|---|
| 8,907,865 B2 | 12/2014 | Miyawaki et al. | |
| 9,415,727 B2 | 8/2016 | Koseki et al. | |
| 2003/0058372 A1 | 3/2003 | Williams et al. | |
| 2004/0196209 A1* | 10/2004 | Chen | G06F 1/1601 345/1.1 |
| 2006/0007191 A1 | 1/2006 | Chi et al. | |
| 2009/0073082 A1 | 3/2009 | Yoshikawa | |
| 2009/0207184 A1* | 8/2009 | Laine | G06F 1/1626 345/619 |
| 2010/0039412 A1* | 2/2010 | Kim | G06F 3/04812 345/204 |
| 2010/0146463 A1* | 6/2010 | Cho | G06F 1/163 715/863 |
| 2012/0280924 A1 | 11/2012 | Kummer et al. | |
| 2013/0271495 A1* | 10/2013 | Nguyen | G04G 17/083 345/649 |
| 2013/0328936 A1 | 12/2013 | Huang | |
| 2015/0091781 A1* | 4/2015 | Yu | G06F 1/163 345/8 |
| 2015/0378662 A1* | 12/2015 | Wan | G06F 3/1423 345/156 |

FOREIGN PATENT DOCUMENTS

| | | |
|---|---|---|
| CN | 101133629 A | 2/2008 |
| CN | 101447178 A | 6/2009 |
| CN | 201274928 Y | 7/2009 |
| CN | 101995884 A | 3/2011 |
| CN | 102213832 A | 10/2011 |
| CN | 103158632 A | 6/2013 |
| CN | 202979130 U | 6/2013 |
| CN | 103353760 A | 10/2013 |
| CN | 103620967 A | 3/2014 |
| CN | 203490903 U | 3/2014 |
| CN | 104635755 A | 5/2015 |
| WO | 2006/058196 A2 | 6/2006 |

* cited by examiner

DISPLAY ADJUSTMENT METHOD AND DEVICE

CROSS-REFERENCE TO RELATED APPLICATIONS

This application is a National Phase Application of International Application No. PCT/CN2015/095078, filed on Nov. 20, 2015, which claims the benefit of priority to Chinese Patent Application No. 201410724962.1, filed on Dec. 3, 2014, and entitled "Display Adjustment Method and Device", each of which is incorporated by reference herein in its entirety.

TECHNICAL FIELD

The present application generally relates to display, and in particular, to display adjustment methods and devices.

BACKGROUND

With the development of electronic devices, more and more electronic display devices are now available in daily life, which greatly enriches leisure time activities.

An office worker reads a file, accesses a web page or the like by means of a computer display almost every day. In a process of using a computer display to read a file, a user may encounter a situation where a display font is excessively small, or a distance between the display and the user is too far to see the file clearly. At this time, the user often needs to move closer or has to wait till the font is adjusted, which negatively affects working efficiency and user experience.

People may use a display of a smart television to view scenery photos after getting home from work. The photos may have horizontal and vertical versions. However, a television is generally placed in a fixed spot, and when a photo of a vertical version is displayed, an effective display area of the television is small, which negatively affects viewing experience of the user.

SUMMARY

An objective of the present application is to provide improved display adjustment methods and devices.

According to an aspect of at least one embodiment of the present application, a display adjustment method is provided, comprising:

acquiring display information of a display; and adjusting a posture and/or a location of the display according to the display information.

According to another aspect of at least one embodiment of the present application, a display adjustment device is provided, comprising:

an acquisition module, configured to acquire display information of a display; and an adjustment module, configured to adjust a posture and/or a location of the display according to the display information.

In the display adjustment methods and devices of the embodiments of the present application, display information of a display is acquired; and further, a posture and/or a location of the display is adjusted according to the display information. A location and a posture of a display can be actively adjusted according to display information, thereby reducing adjustment performed by a user, increasing use efficiency, and improving user experience.

DETAILED DESCRIPTION

Specific implementations of the present application are described in further detail below with reference to the accompanying drawings and embodiments. The following embodiments are intended to describe the present application, but not to limit the scope of the present application.

A person skilled in the art would understand that in the embodiments of the present application, the serial number of each step described below does not mean a specific execution sequence, and the execution sequence of each step should be determined according to the function and internal logic thereof, and should not be any limitation on the implementation procedure of the embodiments of the present application.

When using some display devices, especially some fixed display devices (such as a television), people may often encounter situations of inconvenient viewing where, for example, a front is excessively small, an angle is inappropriate, and the like. In these cases, generally, a user often needs to make manual adjustments, which affects use efficiency and experience. If a display device can actively or automatically adjust a posture and a location of a display according to display information, the display device may serve users more conveniently and intelligently, improving user experience.

Figure 1:
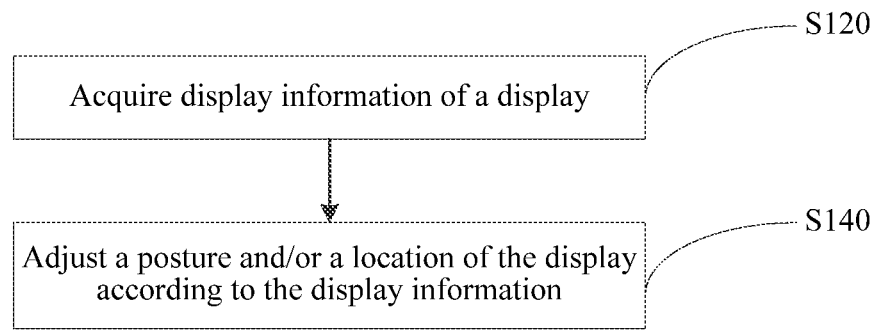
FIG. 1 is a flowchart of a display adjustment method according to an embodiment of the present application.

FIG. 1 is a flowchart of a display adjustment method according to an embodiment of the present application, wherein the method can be implemented, for example, on a display adjustment device. As shown in FIG. 1, the method comprises:

S120. Acquire display information of a display; and

S140. Adjust a posture and/or a location of the display according to the display information.

In the method of this embodiment of the present application, display information of a display is acquired; and further, a posture (e.g., how the display is placed or positioned) and/or a location of the display is adjusted according to the display information, so that a location and a posture of a display can be actively adjusted according to display information, thereby reducing adjustment steps to be performed by a user, increasing use efficiency and user experience.

The following describes functions of step S120 and step S140 in detail with reference to specific implementation manners.

S120. Acquire display information of a display.

The display information may comprise: display content and/or attribute information of the display content. For example, when a display device displays a group of Huangshan scenery photos, the display content thereof is image content in the scenery photos, and the attribute information of the display content may comprise various parameters of the photos such as formats, sizes, typography, and the like.

The display content may be content that is being displayed, or may also be content to be displayed. For example, when a display device is playing a movie, the content that is being displayed is a movie image; and if at this time, the display device receives a QQ message and prepares to display a QQ prompt message, the content to be displayed is the QQ prompt message.

S140. Adjust a posture and/or a location of the display according to the display information.

Adjusting a location of the display may be adjusting the location of the display in a vertical direction and/or a horizontal direction. Adjusting the location of the display in a horizontal direction may be adjusting the location of the display in any direction of forward, backward, to the left, or to the right. That is, adjusting a location of the display may be adjusting the location of the display in any direction in a spatial three-dimensional coordinate system.

Moreover, the location herein may be an absolute location of the display. For example, a display in an office adjusts a height thereof according to the display information. Or, the location may also be a relative location between the display and a user. For example, a display located on a movable apparatus adjusts a distance between the display and the user according to the display information. Although the relative location between the display and the user changes, an absolute location of the display may remain the same.

Figure 2:
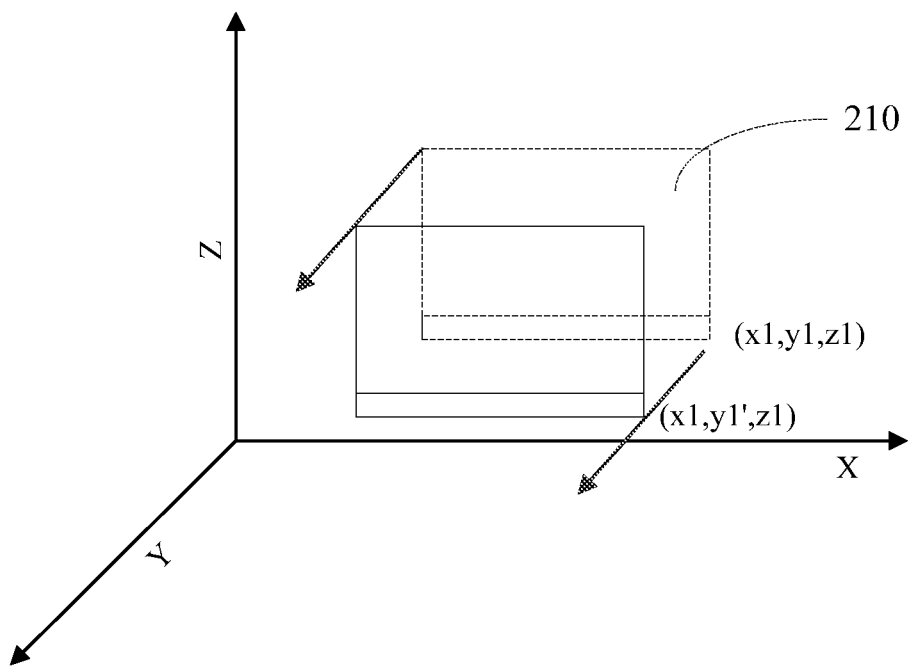
FIG. 2 is a schematic diagram of location adjustment of a display according to an implementation manner of the present application.

As shown in FIG. 2, in a three-dimensional space, in a case in which an excessively small current display font is determined according to the display information, a display 210 may move from a first location (coordinates of a lower-right corner of the display 210 at the first location are (x1,y1,z1)) to a second location (coordinates of a lower-right corner of the display 210 at the second location are (x1,y1',z1)) in a positive direction along a Y axis. Similarly, the display 210 may also move, according to the display information, in a negative direction along the Y axis, in positive and negative directions along a Z axis, or in positive and negative directions along an X axis. For example, when the display displays a screensaver, the display 210 actively moves in the negative direction along the Y axis back to an original first location.

Adjusting a posture of the display may be implemented by rotating the display. When the display is rotated, according to different display information, a rotation axis and a rotation angle may vary.

Figure 3A:
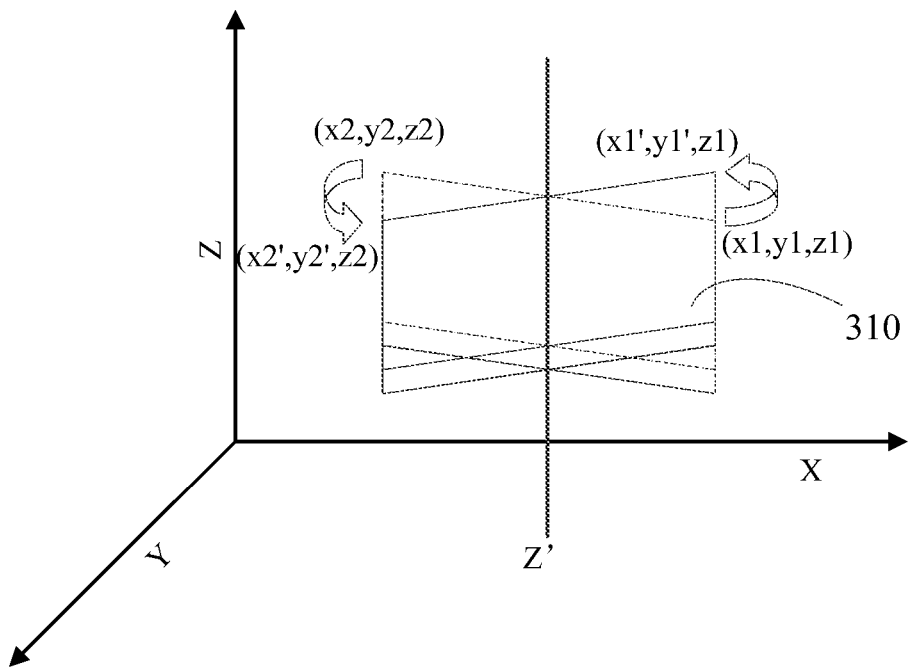
FIG. 3a and FIG. 3b are schematic diagrams of posture adjustment of a display according to another implementation manner of the present application.

For example, as shown in FIG. 3a, when it is determined according to the display information that currently (or to be) displayed content comprises the QQ prompt message, a display 310 may rotate by 30 degrees counterclockwise along a Z axis in FIG. 3a, and then rotate by 30 degrees clockwise to restore an original posture, so as to remind a user that there is a new message currently.

Figure 3B:
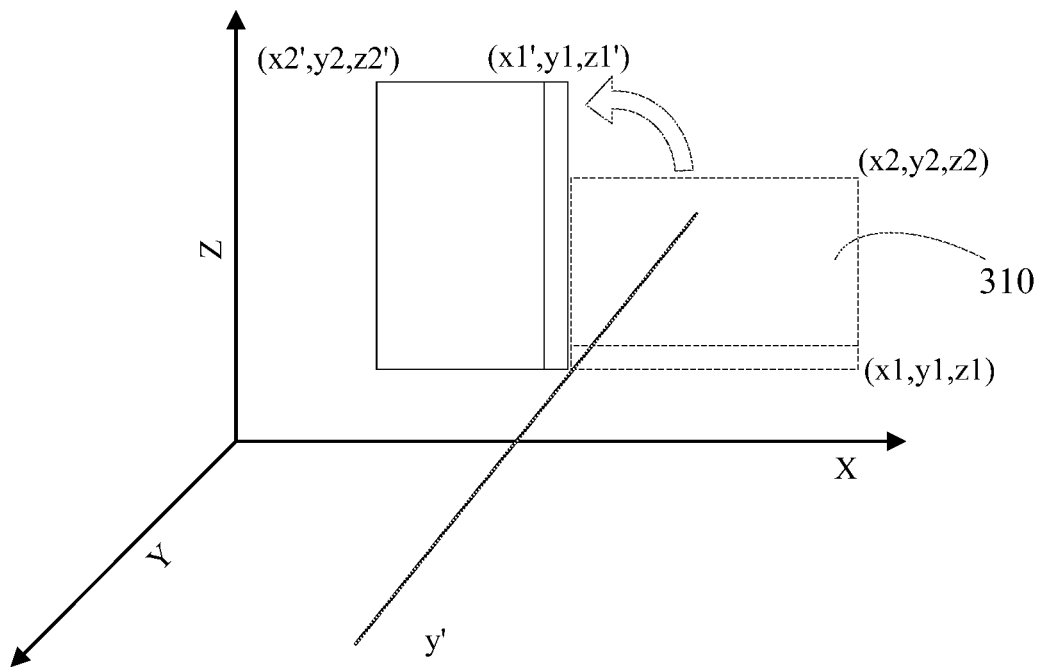

For example again, as shown in FIG. 3b, the display 310 sequentially displays photos in a folder. A photo of a horizontal version is currently displayed, and a photo of a vertical version is displayed next. After the horizontal version photos are displayed, the display 310 actively rotates by 90 degrees counterclockwise along a Y' axis in FIG. 3b, so as to display the following photos of vertical version and fully use the display areas.

Specifically, in step S140, a corresponding target posture and/or target location may be determined first according to the display information; then a corresponding adjustment policy is developed according to a current posture and/or location and an adjusted target posture and/or target location of the display; and the display is adjusted according to the adjustment policy. Corresponding relationships between the display information and the target posture and/or the target location may be predetermined.

The display of the present application may only have one display module, for example, like many televisions and computer displays. Correspondingly, an adjustment to the display is namely an adjustment to the one display module. In some display devices, a display thereof may comprise multiple display modules, for example in display scenarios of a splice display, expansion display, and the like.

Therefore, in an implementation manner, adjusting a location of the display according to the display information comprises:

adjusting, according to the display information, a location of at least one display module of the multiple display modules.

Figure 4A:
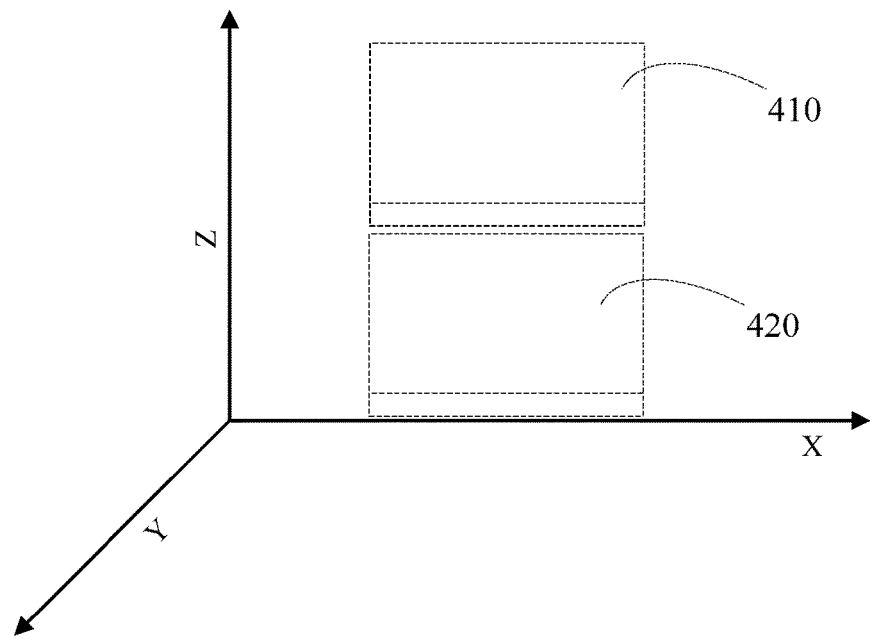
FIG. 4a and FIG. 4b are schematic diagrams of location adjustment of a display comprising multiple display modules according to an implementation manner of the present application.
Figure 4B:
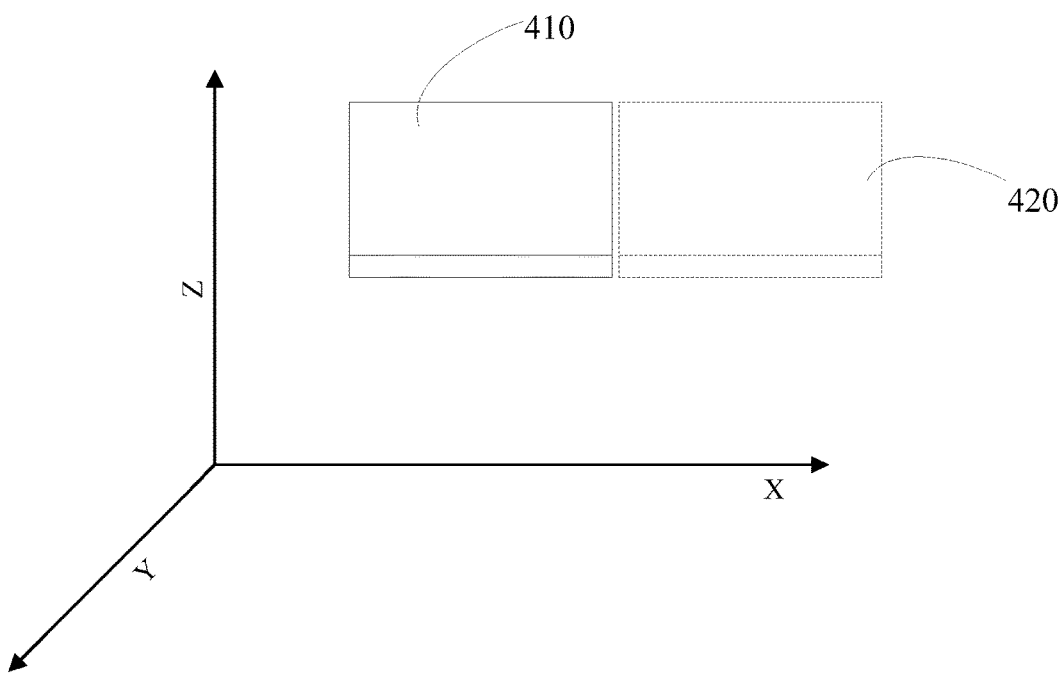

For example, as shown in FIG. 4a and FIG. 4b, one display comprises two display modules: a first display module 410 and a second display module 420. As shown in FIG. 4a, at the beginning, the two display modules are set one above the other. The first display module 410 is located above the second display module 420. As shown in FIG. 4b, when a movie is played, the second display module 420 actively adjusts to a right side of the first display module 410, so as to broaden a screen to play the movie.

In an implementation manner, adjusting a posture of the display according to the display information comprises:

adjusting, according to the display information, a posture of at least one display module of the multiple display modules.

Figure 5A:
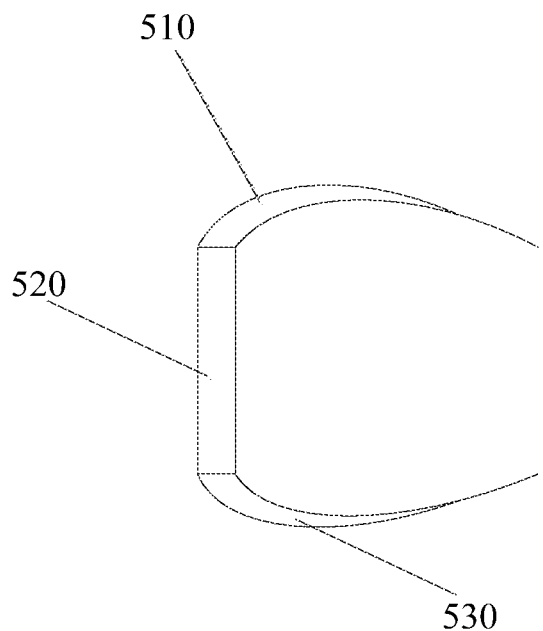
FIG. 5a and FIG. 5b are schematic diagrams of adjustment posture of a display comprising multiple display modules according to another implementation manner of the present application.
Figure 5B:
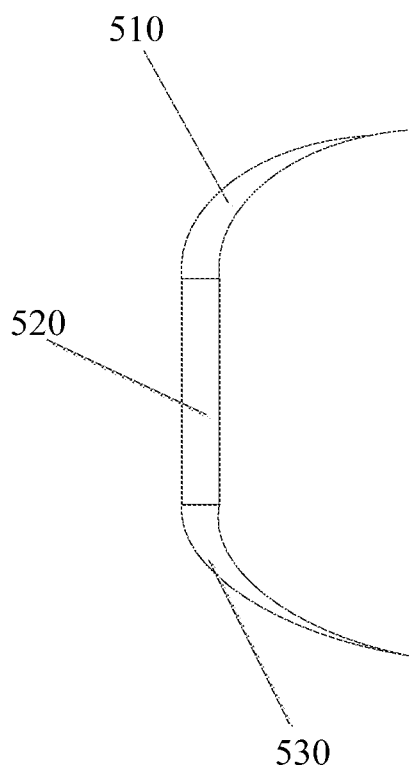

For example, as shown in FIG. 5a, a smart wrist band with a call function comprises three display modules: a first display module 510, a second display module 520, and a third display module 530. The first display module 510 and the third display module 530 are symmetrically set at two sides of the second display module 520; and the first display module 510 and the third display module 530 have certain radians and are both rotationally connected to the second display module 520. In a normal state, both the first display module 510 and the third display module 530 rotate towards the wrist, and the three display modules form a "C" shape; and when the display content is a phone call interface, the first display module 510 and the third display module 530 rotate in a direction away from the wrist, so that it is convenient for a user to take off the smart wrist band to respond to the call.

Moreover, in step S140 of an embodiment of the present application, the posture and/or the location of the display are adjusted according to the display information by means of at least one of an electrical field force, a magnetic force, an elastic force, and a frictional force.

Specifically, the display may be adjusted by means of a gear, a crankshaft, a telescopic boom, or the like, or the display may also be adjusted by setting a metal coil in the display to further use an electromagnetic field.

Moreover, an embodiment of the present application further provides a computer readable medium, which comprises a computer readable instruction performing the following operations when executed: performing operations of steps S120 and S140 of the method in the implementation manner shown in FIG. 1.

In conclusion, in the method of this embodiment of the present application, a posture and/or a location of a display is adjusted according to display information, so that a location and a posture of a display can be actively adjusted according to the display information, thereby reducing adjustment steps to be performed a user, increasing use efficiency and improving user experience.

Figure 6:
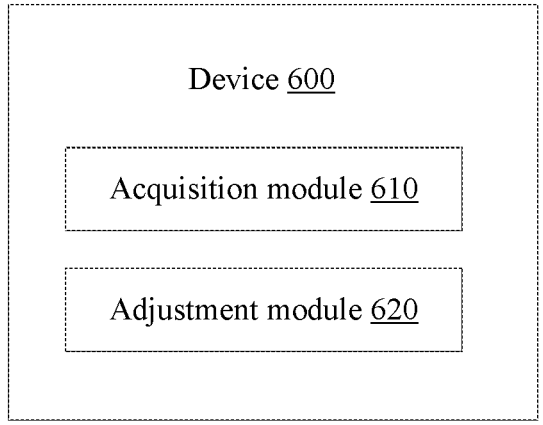
FIG. 6 is a schematic diagram of a module structure of a display adjustment device according to an embodiment of the present application.

FIG. 6 is a schematic diagram of a module structure of a display adjustment device according to an embodiment of the present application, wherein the display adjustment device may be used as a functional module to be set in a display device such as a smart watch, a smart television, and a computer display, so as to be used by users. As shown in FIG. 6, a device 600 may comprise:

an acquisition module 610, configured to acquire display information of a display; and an adjustment module 620, configured to adjust a posture and/or a location of the display according to the display information.

In the device of this embodiment of the present application, display information of a display is acquired; and further, a posture and/or a location of the display is adjusted according to the display information, so that a location and a posture of a display can be actively adjusted according to display information, thereby reducing adjustment steps to be performed by a user, increasing a use efficiency, and improving user experience.

The following will describe functions of the acquisition module 610 and the adjustment module 620 in detail with reference to specific implementation manners.

The acquisition module 610 is configured to acquire display information of a display.

The display information may comprise: display content and/or attribute information of the display content. For example, when a display device displays a group of Huangshan scenery photos, the display content thereof is image content in the scenery photos, and the attribute information of the display content may comprise various parameters of the photo, such as formats, sizes, typography, and the like of the photos.

The display content may be content that is being displayed, or may also be content to be displayed. For example, when a display device is playing a movie, the content that is being displayed is a movie image; and if at this time, the display device receives a QQ message and prepares to display a QQ prompt message, the content to be displayed is the QQ prompt message.

The acquisition module 610 may acquire the display information from a module such as a display drive circuit or a graphics card.

The adjustment module 620 is configured to adjust a posture and/or a location of the display according to the display information.

Figure 7:
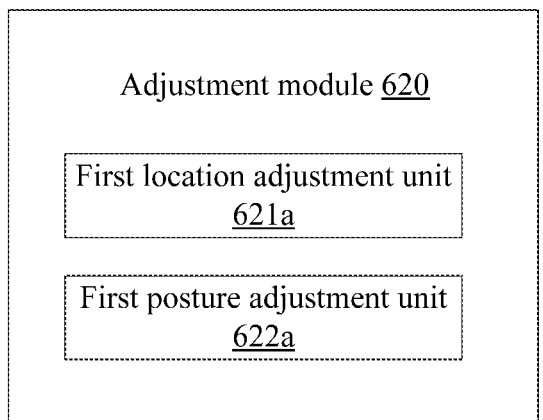
FIG. 7 is a schematic diagram of a module structure of an adjustment module according to an implementation manner of the present application.

In an implementation manner, referring to FIG. 7, the adjustment module 620 comprises:

a first location adjustment unit 621a, configured to adjust the location of the display according to the display information in a vertical direction and/or a horizontal direction.

Adjusting, by the first location adjustment unit 621a, a location of the display may be adjusting the location of the display in a vertical direction and/or a horizontal direction. The adjusting the location of the display in a horizontal direction may be adjusting the location of the display in any direction of forward, backward, to the left, and to the right. That is, the adjusting a location of the display may be adjusting the location of the display in any direction in a spatial three-dimensional coordinate system.

Moreover, the location herein may be an absolute location of the display. For example, a display in an office adjusts a height thereof according to the display information. Or, the location may also be a relative location between the display and a user. For example, a display located on a movable apparatus adjusts a distance between the display and the user according to the display information. Although the relative location between the display and the user changes, an absolute location of the display may not change.

In an implementation manner, referring to FIG. 7, the adjustment module 620 further comprises:

a first posture adjustment unit 622a, configured to adjust, according to the display information, the posture of the display by rotating the display.

Adjusting, by the first posture adjustment unit 622a, a posture of the display may be implemented by rotating the display. When the display is rotated, according to different display information, a rotation axis and a rotation angle may vary.

Specifically, the adjustment module 620 may determine a corresponding target posture and/or target location first according to the display information; then develop a corresponding adjustment policy according to a current posture and/or location and an adjusted target posture and/or target location of the display; and adjust the display according to the adjustment policy. Corresponding relationships between the display information and the target posture and/or the target location may be predetermined.

The display of the present application may only have one display module, for example, like many televisions and computer displays. Correspondingly, an adjustment to the display is namely an adjustment to the one display module. In some display devices, a display thereof may comprise multiple display modules, for example in display scenarios of a splice display, expansion display, and the like.

Figure 8:
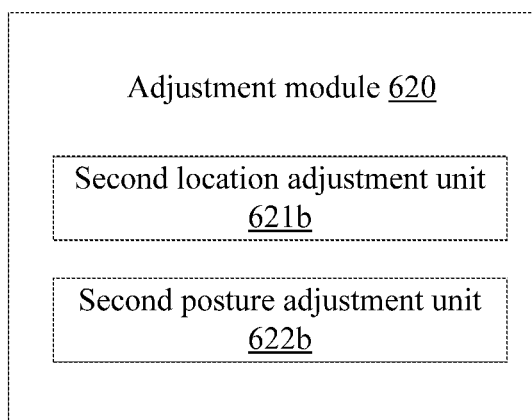
FIG. 8 is a schematic diagram of a module structure of an adjustment module according to another implementation manner of the present application.

Therefore, in an implementation manner, referring to FIG. 8, the adjustment module 620 comprises:

a second location adjustment unit 621b, configured to adjust, according to the display information, a location of at least one display module of the multiple display modules.

For example, as shown in FIG. 4a and FIG. 4b, one display comprises two display modules: a first display module 410 and a second display module 420. As shown in FIG. 4a, at the beginning, the two display modules are set one above the other. The first display module 410 is located above the second display module 420. As shown in FIG. 4b, when a movie is played, the second location adjustment unit 621b controls the second display module 420 to actively adjust to a right side of the first display module 410, so as to broaden a screen to play the movie.

In an implementation manner, referring to FIG. 8, the adjustment module 620 further comprises:

a second posture adjustment unit 622b, configured to adjust, according to the display information, a posture of at least one display module of the multiple display modules.

For example, as shown in FIG. 5a, a smart wrist band with a call function comprises three display modules: a first display module 510, a second display module 520, and a third display module 530. The first display module 510 and the third display module 530 are symmetrically set at two sides of the second display module 520; and the first display module 510 and the third display module 530 have certain radians and are both rotationally connected to the second display module 520. In a normal state, both the first display module 510 and the third display module 530 rotate towards a wrist, and the three display modules form a "C" shape; and when the display content is a phone call interface, the second posture adjustment unit 622b controls the first display module 510 and the third display module 530 to rotate in a direction away from the wrist, so that it is convenient for a user to take off the smart wrist band to respond to the call.

Moreover, the adjustment module 620 of the present application may adjust the posture and/or the location of the display according to the display information by means of at least one of a mechanical force and a magnetic force.

In a case in which the display is adjusted by means of the mechanical force, the display may be adjusted by means of a gear, a crankshaft, a telescopic boom, or the like.

In a case in which the display is adjusted by means of the magnetic force, the display may be adjusted by setting a metal coil in the display to further use an electromagnetic field.

An application scenario of the display adjustment methods and devices of the embodiments of the present application may be as follows: a user in an office uses a desktop computer display to open a WORD document to prepare to edit the document; words in the document are small, for example, Font 9, and the display adjustment device determines that Font 9 is smaller than default Font 14 after acquiring font information, and actively moves the display forward from an original location by 10 cm; and after the document editing is finished, the user clicks a video, and the display adjustment device actively moves the display to the original location, and adjusts vertical display to horizontal display by rotating the display.

Figure 9:
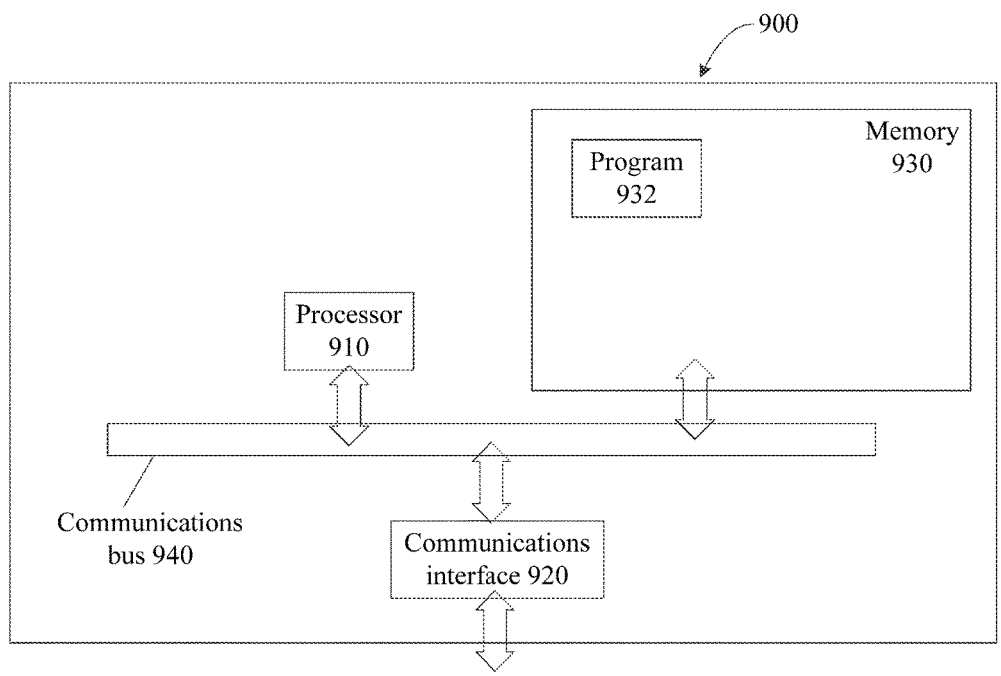
FIG. 9 is a schematic diagram of a hardware structure of a display adjustment device according to an embodiment of the present application.

A hardware structure of a display adjustment device according to an embodiment of the present application is as shown in FIG. 9. Specific embodiments of the present application are not intended to limit the specific implementation of the display adjustment devices disclosed herein. As shown in FIG. 9, the device 900 may comprise:

a processor 910, a communications interface 920, a memory 930, and a communications bus 940, wherein:

The processor 910, the communications interface 920, and the memory 930 communicate with each other by using the communications bus 940.

The communications interface 920 is configured to communicate with other network elements.

The processor 910 is configured to execute a program 932, and may specifically execute relevant steps in the method embodiment shown in FIG. 1.

Specifically, the program 932 may comprise program code, wherein the program code comprises computer operation instructions.

The processor 910 may be a central processing unit (CPU), or an application specific integrated circuit (ASIC), or may be configured as one or more integrated circuits that implement the embodiments of the present application.

The memory 930 is configured to store the program 932. The memory 930 may comprise a high speed random access memory (RAM), and may also comprise a non-volatile memory such as at least one magnetic disk memory. The program 932 may specifically execute the following steps:

acquiring display information of a display; and adjusting a posture and/or a location of the display according to the display information.

For the specific implementation of the steps in the program 932, reference may be made to corresponding steps or modules in the foregoing embodiments, which are not described herein again. A person skilled in the art may clearly understand, for specific working procedures of the devices and modules described above, reference may be made to the description of corresponding procedures in the foregoing method embodiments, which are not described herein again.

It can be appreciated by a person of ordinary skill in the art that, exemplary units and method steps described with reference to the embodiments disclosed in this specification can be implemented by electronic hardware or a combination of computer software and electronic hardware. Whether these functions are executed by hardware or software depends on specific applications and design constraints of the technical solution. A person skilled in the art may use different methods to implement the described functions for each specific application, but such implementation should not be construed as a departure from the scope of the present application.

If the function is implemented in the form of a software functional unit and is sold or used as an independent product, the product can be stored in a computer-readable storage medium. Based on this understanding, the technical solution of the present application essentially, or the part that contributes to the prior art, or a part of the technical solution may be embodied in the form of a software product; the computer software product is stored in a storage medium and comprises several instructions for enabling a computer device (which may be a personal computer, a server, a controller, or the like) to execute all or some of the steps of the method in the embodiments of the present application. The foregoing storage medium comprises: any medium that can store program code, such as a USB flash drive, a removable hard disk, a read-only memory (ROM), a random access memory (RAM), a magnetic disk, or an optical disc.

The foregoing implementations are only used to describe and explain the present application, but not to limit the present application. A person of ordinary skill in the art may make various alterations and modifications without departing from the spirit and scope of the present application; therefore, all equivalent technical solutions also fall within the scope of the present application, and the patent protection scope of the present application should be subject to the claims.

What is claimed is:

1. A display adjustment method, comprising:
    acquiring display information of a display, wherein the display includes a smart wrist band with a call function and comprises multiple display modules; and
    adjusting a posture and/or a location of the display according to the display information, wherein the adjusting includes rotating, in response to a phone call interface presented on the smart wrist band, at least one of the multiple display modules at at least one end of the smart wrist band in a direction away from the wrist of a user to allow the smart wrist band to be removed from the wrist.

2. The method of claim 1, wherein the display information comprises: display content and/or attribute information of the display content.

3. The method of claim 2, wherein the display content comprises: content that is being displayed or content to be displayed.

4. The method of claim 1, wherein the adjusting a location of the display according to the display information comprises:
adjusting, according to the display information, the location of the display in a vertical direction and/or a horizontal direction.

5. The method of claim 1, wherein the location comprises: an absolute location of the display or a relative location between the display and a user.

6. The method of claim 1, wherein the adjusting a posture and/or a location of the display according to the display information comprises:
adjusting, according to the display information, the posture and/or the location of the display by means of at least one of an electrical field force, a magnetic force, an elastic force, and a frictional force.

7. A display adjustment device, comprising:
an acquisition module, configured to acquire display information of a display, wherein the display includes a smart wrist band with a call function and comprises multiple display modules: and
an adjustment module, configured to adjust a posture and/or a location of the display according to the display information, wherein the adjustment module is further configured to rotate, in response to a phone call interface presented on the smart wrist band, at least one of the multiple display modules at at least one end of the smart wrist band in a direction away from the wrist of a user to allow the smart wrist band to be removed from the wrist.

8. The device of claim 7, wherein the adjustment module comprises:
a first location adjustment unit, configured to adjust the location of the display according to the display information in a vertical direction and/or a horizontal direction.

9. The device of claim 7, wherein the adjustment module is configured to adjust, according to the display information, the posture and/or the location of the display by means of at least one of an electrical field force, a magnetic force, an elastic force, and a frictional force.

10. A display device, comprising: the display adjustment device of claim 7.

11. A non-transitory computer-readable medium comprising a set of executable instructions, when executed by one or more processors, causing the one or more processors to perform the following:
acquiring display information of a display, wherein the display includes a smart wrist band with a call function and comprises multiple display modules: and
adjusting a posture and/or a location of the display according to the display information, wherein the adjusting includes rotating, in response to a phone call interface presented on the smart wrist band, at least one of the multiple display modules at at least one end of the smart wrist band in a direction away from the wrist of a user to allow the smart wrist band to be removed from the wrist.

12. A display adjustment device comprising a processor and a memory, the memory storing computer executable instructions, when executed by the processor, causing the processor to perform the following:
acquiring display information of a display, wherein the display includes a smart wrist band with a call function and comprises multiple display modules: and
adjusting a posture and/or a location of the display according to the display information, wherein the adjusting includes rotating, in response to a phone call interface presented on the smart wrist band, at least one of the multiple display modules at at least one end of the smart wrist band in a direction away from the wrist of a user to allow the smart wrist band to be removed from the wrist.

* * * * *